United States Patent [19]
Sommerfeld

[11] 3,940,361
[45] Feb. 24, 1976

[54] DISPERSIONS OF STYRENE/ACRYLONITRILE COPOLYMERS

[75] Inventor: Eugene G. Sommerfeld, Penn Valley, Pa.

[73] Assignee: E. I. Du Pont de Nemours and Company, Wilmington, Del.

[22] Filed: Oct. 11, 1972

[21] Appl. No.: 296,639

[52] U.S. Cl.... 260/30.4 N; 260/29.1 R; 260/31.2 N; 260/31.4 R; 260/32.8 N; 260/33.2 R; 260/33.4 R
[51] Int. Cl.².... C08K 5/05; C08K 5/06; C08K 5/07; C08K 5/15
[58] Field of Search..... 260/33.4 R, 32.8 N, 34.2 R, 260/31.2 N, 29.1 R, 30.4 N, 31.4 R, 33.2 R

[56] References Cited
UNITED STATES PATENTS

| | | | |
|---|---|---|---|
| 2,941,972 | 6/1960 | DeWitt | 260/30.4 N |
| 3,166,524 | 1/1965 | Schmidle | 260/23 |
| 3,317,635 | 4/1967 | Osmond | 260/881 |
| 3,405,087 | 10/1968 | Fryd | 260/33.6 |
| 3,455,862 | 7/1969 | Opferkuch | 260/32.6 |
| 3,574,177 | 4/1971 | Nakayuma | 260/88.7 |
| 3,691,123 | 9/1972 | Clarke | 260/29.1 |

*Primary Examiner*—James H. Derrington

[57] ABSTRACT

Coating compositions containing copolymers of ethylenically unsaturated aromatic monomers and ethylenically unsaturated nitrile monomers are useful for coating paper, plastics, metals and other packaging materials. These compositions, when blended with vinyl polymers, show improved flexibility and adhesion.

12 Claims, No Drawings

DISPERSIONS OF STYRENE/ACRYLONITRILE COPOLYMERS

STATEMENT OF THE INVENTION

This invention relates to dispersions. It is more particularly directed to dispersions containing copolymers of ethylenically unsaturated aromatic monomers and ethylenically unsaturated nitrile monomers, dispersed in organic liquid carriers.

These dispersions are extraordinarily stable, a surprising phenomenon since they contain no mechanisms, internal or external, for stabilizing them against settling or flocculation.

The copolymers in these dispersions are thermoplastic materials with excellent barrier properties, that is to say, they resist migration of gases through their films. This makes the dispersions especially suited for coating porous materials such as paper, metal or plastics for use as packaging materials, particularly those which are to come in contact with food.

THE COPOLYMERS

The copolymers used in the dispersions are composed of a. 25–75 percent, by weight, of a monomer represented by the structure

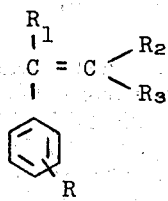

where R, $R_1$, $R_2$, and $R_3$ are hydrogen or an alkyl radical of 1–5 carbon atoms,
and b. 24–75 percent, by weight, of an ethylenically unsaturated nitrile monomer, the total of (a) and (b) being 100 percent.

Illustrative of (a) monomers are styrene, α-methyl styrene, vinyl toluene and the like. The best copolymers, in terms of final film properties, are those in which the (a) monomer is styrene.

The (a) monomer is preferably present in the copolymer at a concentration of 40–65 percent, by weight, even more preferably 50–60 percent. For some purposes 40–50 percent may be best, for others 55–60 percent. Even 20–40 percent or 60–75 percent may be preferred in some cases.

The (b) monomer can be any ethylenically unsaturated nitrile copolymerizable with the other monomer used to prepare the copolymer. This nitrile monomer is preferably one represented by the structure

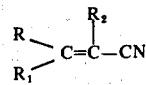

where
R and $R_1$ are hydrogen, an alkyl radical of 1–18 carbon atoms, tolyl, benzyl or phenyl,
and $R_2$ is hydrogen or methyl.

The best copolymers, in terms of final film properties, are those which contain acrylonitrile or methacrylonitrile as the nitrile monomer.

The copolymers preferably contain 35–60 percent of nitrile monomer, even more preferably 40–50 percent, by weight, of the polymer. It may be desirable for certain purposes to use 40–45 percent or 50–60 percent. One may elect to use 20–40 percent or even 60–75 percent if circumstances dictate.

While in the usual case one would use only a single type of (a) monomer and of (b) monomer, it may be that for certain applications mixtures of (a) monomers or mixtures of (b) monomers can be used to advantage.

THE DISPERSIONS

Although dispersions containing the copolymers are generally quite satisfactory in coating applications, their films may lack the high degree of flexibility required for certain uses. If this is so, a halovinyl polymer (or polymers) or a halovinylidene polymer (or polymers) may be added. Illustrative of these are polyvinyl chloride, polyvinylidene chloride and copolymers of vinyl chloride or vinylidene chloride with one or more of acrylonitrile
fumaric acid or its esters and half esters of 1–8 carbon atoms
maleic acid or its esters and half esters of 1–8 carbon atoms
itaconic acid
vinyl acetate
vinyl alcohol
5-norbornene-2,3-dicarboxylic acid mono n-butyl ester
glycidyl methacrylate Specific within this illustrative grouping are
vinyl chloride/vinylidene chloride copolymers
vinyl chloride/acrylonitrile/itaconic acid terpolymers
vinyl chloride/acrylonitrile copolymers
vinyl chloride/acrylonitrile/fumaric acid terpolymers
vinyl chloride/acrylonitrile/maleic acid terpolymers
vinyl chloride/vinyl acetate copolymers
vinyl chloride/maleic acid copolymers
vinyl chloride/vinyl acetate/maleic acid terpolymers
vinyl chloride/fumaric acid copolymers
vinyl chloride/vinyl acetate/fumaric acid terpolymers
vinyl chloride/vinyl acetate/vinyl alcohol terpolymers Polyvinyl fluoride, polyvinylidene fluoride and polyvinyl acetate can also be used, as well as mixtures of any of the above.

These polymers are freely available on the market and are usually provided in the form of powders or pellets.

The dispersions of the invention therefore contain a. 75–100 percent, preferably 85–95 percent, by weight of the solids in the dispersion, of the copolymer;
and b. an organic liquid carrier.

These dispersions may also contain 0.25–25 percent, preferably 8–12 percent by weight of the solids in the composition, of a vinyl or a vinylidene polymer.

The organic liquid carrier can be any which will serve as the polymerization medium in the preparation of the copolymer, which will dissolve or suspend the vinyl polymer (should it be used) and which will not interfere with the composition's intended use.

Preferably, this liquid carrier is composed of
a. 20–80 percent, by weight of the total medium, of ethylene carbonate or propylene carbonate, and
b. 20–80 percent, by weight of the total medium, of an organic liquid miscible with ethylene carbonate or propylene carbonate.

Illustrative of such miscible organic liquids are alkanols of 1–4 carbon atoms (preferably isopropanol), acetone, methylethyl ketone, ether alcohols, esters of ether alcohols, diacetone alcohol and tetrahydrofuran.

The (a) to (b) weight ratio in the liquid carrier is preferably about 40–60/40–60, even more preferably 50/50.

HOW THE DISPERSIONS ARE MADE

The dispersions are made by directly preparing the copolymer to be used in an organic liquid which will also serve as the liquid carrier for the dispersion. These copolymers are prepared by polymerizing suitable monomers, in appropriate amounts, in one of the organic liquids or mixtures of liquids already described.

A catalyst or polymerization initiator, in the usual amount, is ordinarily used in the process. This can be any free radical initiator that decomposes with a half-life of ¼ to 2½ hours at the reflux temperature of the organic liquid medium being used. The best result appears to be achieved with tertiary butyl peroxypivalate or tertiary butyl peroxyisobutyrate.

The preparation process is begun by charging a mixture of 40–60 percent, by weight of the total charge, of appropriate monomers and about 40–60 percent, by weight of the total charge, of the organic liquid medium to a reaction vessel. Six-tenths percent, by weight of the monomer charge, of catalyst is then added.

The reaction mass is then raised to about 70° C., with agitation. After the reaction mass has reached 70° C., heating is stopped and exotherm ordinarily begins. The temperature of the reaction mass then rises slowly until refluxing begins. Refluxing is generally continued for about one hour without addition of heat. Heat is then supplied as needed to hold the reaction mass at reflux temperature for 15 minutes. At the end of this period another 0.3 percent of catalyst is added.

After one more hour of reaction at reflux temperature, still another 0.3 percent of catalyst is added, followed by another 2 hour period of reaction at reflux temperature. At the end of this period polymerization is ordinarily complete.

During polymerization, the viscosity of the reaction mass can be kept within handling limits by addition of one or both of the liquids used as the polymerization medium.

The resulting dispersion can be used directly as a coating composition, with viscosity reduction with butyrolactone, methylethyl ketone, propylene carbonate, ethylene carbonate or mixtures of these if needed. If additional flexibility is desired, a suitable amount of a halovinyl or halovinylidene polymer can be added directly, with agitation.

If other adjuncts such as pigments, plasticizers, lubricants, aminoplast resins, epoxy resins or the like are desired, they can be added at this point.

The coating compositions can be used by applying them to a substrate by such conventional means as spraying, brushing, dipping, roller-coating or the like. In the ordinary case, the compositions are sprayed to a thickness of 0.1 mil (dry). The coatings are then cured by baking for from 2–5 minutes at temperatures of from 100°–110° C. with plastic substrates or 2–5 minutes at 150°–200° C. for metal substrates.

DESCRIPTION OF THE PREFERRED EMBODIMENTS

Those skilled in this art will be able to practice this invention more easily after referring to the following illustrative examples.

It will be apparent to those artisans tht numerous variations can be composed on their central theme, such as the use of polymers containing additional monomer units, or use of monomer units which vary in chemical nature slightly but insignificantly from those disclosed, or the addition of innocuous components and adjuncts to the compositions. All of these variations are naturally considered to be part of the inventive concept.

In the examples all parts are by weight.

EXAMPLE 1

To a reaction kettle were charged

|  | Parts |
|---|---|
| Acrylonitrile | 135 |
| Styrene | 165 |
| Isopropanol | 99.1 |
| Propylene carbonate | 99.1 |
| Lupersol 11[1.] | 1.8 |

[1.]Tertiary butyl peroxypivalate, sold by Pennwalt Corp.

This mixture was brought to reflux temperature and held there for one hour and 15 minutes, heat being supplied as needed to maintain temperature.

At the end of this period, 0.3 percent of Lupersol was added, followed by another one hour reaction period at reflux temperature. Five minutes after the addition of the Lupersol, the addition of 100 parts of a mixture of isopropanol and propylene carbonate 50/50 was begun, which continued over a 30-minute period.

Another 0.3 percent of Lupersol was then added, followed by still another 2 hour period at reflux temperature.

At this point polymerization was complete. Fifty parts of butyrolactone were added to the mass to give a dispersion containing 46 percent solids.

Two hundred parts of methylethyl ketone were added to this dispersion, with mixing.

This composition was drawn on packaging paper, to a thickness of 0.1 mil (dry), with a wire wound rod. The paper was then baked for 3 minutes at 105° C.

EXAMPLE 2

To 50 parts of the organosol of Example 1 (after complete reduction with solvents) were added

|  | Parts |
|---|---|
| Resimine 751[1.] | 4.26 |
| Methylethyl ketone | 5 |
| Epon 828[2.] | 1.14 |

[1.]A methylated melamine-formaldehyde resin sold by Monsanto Chemical Co.
[2.]Condensation product of a bisphenol with epichlorohydrin, with an epoxide equivalent weight of 180–195, sold by Shell Chemical Co.

This mass was stirred and to it were then added 3.2 parts of a vinyl chloride/vinyl acetate/vinyl alcohol 90/4/6 terpolymer[3.].

[3.]VAGD, sold by Union Carbide Co.

This composition was drawn on an aluminum panel, to a thickness of 0.3 mils (dry), with a wire wound rod. The panel was then baked for 5 minutes at 185° C. to give a hard, glossy, water-white finish, more flexible than the finish in Example 1.

I claim:
1. A composition comprising
   A. 75–100 percent, by weight of solids, of a particulate copolymer of
      1. 25–75 percent, by weight, of at least one monomer represented by the structure

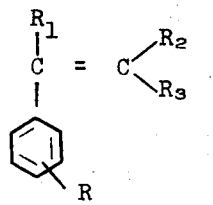

where R, $R_1$, $R_2$ and $R_3$ are hydrogen or an alkyl radical of 1–5 carbon atoms;
   and
      2. 25–75 percent, by weight, of at least one ethylenically unsaturated nitrile monomer, the total of (1) and (2) being 100 percent;
   and
   B. an organic liquid carrier comprising
      1. 20–80 percent, by weight, of ethylene carbonate or propylene carbonate,
   and
      2. 20–80 percent, by weight, of an alkanol of 1–4 carbon atoms, acetone, methylethyl ketone, an ether alcohol, an ester of an ether alcohol or tetrahydrofuran.
2. A composition comprising
   A. 75–100 percent, by weight of solids, of a particulate copolymer of
      1. 25–75 percent, by weight, of at least one monomer represented by the structure

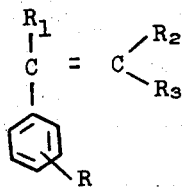

where R, $R_1$, $R_2$ and $R_3$ are hydrogen or an alkyl radical of 1–5 carbon atoms;
   and
      2. 25–75 percent, by weight, of at least one ethylenically unsaturated nitrile monomer, the total of (1) and (2) being 100 percent;
   and
   B. 0.25–25 percent, by weight of solids, of a halovinyl polymer or halovinylidene polymer;
   and
   C. an organic liquid carrier comprising
      1. 20–80 percent, by weight, of ethylene carbonate or propylene carbonate,
   and
      2. 20–80 percent, by weight, of an alkanol of 1–4 carbon atoms, acetone, methylethyl ketone, an ether alcohol, an ester of an ether alcohol or tetrahydrofuran, the organic liquid being a solvent or suspandant for (B).
3. The composition of claim 1 where (A)(1) is styrene.
4. The composition of claim 2 where (A)(1) is styrene.
5. The composition of claim 1 where (A)(2) is represented by the structure

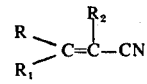

where
R and $R_1$ are hydrogen, an alkyl radical of 1–18 carbon atoms, tolyl, benzyl or phenyl,
and
$R_2$ is hydrogen or methyl.
6. The composition of claim 2 where (A)(2) is represented by the structure

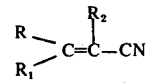

where
R and $R_1$ are hydrogen, an alkyl radical of 1–18 carbon atoms, tolyl, benzyl or phenyl,
and
$R_2$ is hydrogen or methyl.
7. The composition of claim 5 where the nitrile is acylonitrile or methacrylonitrile.
8. The composition of claim 6 where the nitrile is acrylonitrile or methacrylonitrile.
9. The composition of claim 1 where (B)(2) is isopropanol.
10. The composition of claim 2 where (C)(2) is isopropanol.
11. The composition of claim 1 where (A)(1) is styrene, (A)(2) is acrylonitrile and (B)(2) is isopropanol.
12. The composition of claim 2 where (A)(1) is styrene, (A)(2) is acrylonitrile and (C)(2) is isopropanol.

* * * * *